United States Patent
Xie et al.

(10) Patent No.: US 8,371,009 B2
(45) Date of Patent: Feb. 12, 2013

(54) METHODS FOR REPAIRING COMPOSITE CONTAINMENT CASINGS

(75) Inventors: Ming Xie, Beavercreek, OH (US); Donald George Lachapelle, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 446 days.

(21) Appl. No.: 11/954,896

(22) Filed: Dec. 12, 2007

(65) Prior Publication Data
US 2009/0151142 A1    Jun. 18, 2009

(51) Int. Cl.
*B21D 53/92*    (2006.01)
*B23P 6/00*    (2006.01)

(52) U.S. Cl. .................. 29/402.11; 29/809.7; 29/402.09; 415/9; 415/173.4; 415/174.4

(58) Field of Classification Search ............... 29/402.01, 29/402.09, 402.11, 402.18, 402.21, 889.2, 29/419.1, 889.7; 415/9, 173.4, 174.4
See application file for complete search history.

(56) References Cited

U.S. PATENT DOCUMENTS

| | | | | |
|---|---|---|---|---|
| 3,053,694 A | * | 9/1962 | Daunt et al. | 427/230 |
| 4,149,824 A | | 4/1979 | Adamson | |
| 4,411,589 A | | 10/1983 | Joubert et al. | |
| 4,452,565 A | | 6/1984 | Monhardt et al. | |
| 4,500,252 A | | 2/1985 | Monhardt et al. | |
| 4,517,038 A | * | 5/1985 | Miller | 156/98 |
| 4,598,449 A | | 7/1986 | Monhardt et al. | |
| 4,699,567 A | * | 10/1987 | Stewart | 415/200 |
| 4,793,879 A | * | 12/1988 | Mimbs | 156/98 |
| 4,808,253 A | * | 2/1989 | Mimbs | 156/98 |
| 4,824,500 A | * | 4/1989 | White et al. | 156/94 |
| 4,910,065 A | * | 3/1990 | McKinney | 428/116 |
| 4,914,794 A | * | 4/1990 | Strangman | 29/889.2 |
| 4,916,880 A | * | 4/1990 | Westerman, Jr. | 52/514 |
| 4,961,685 A | | 10/1990 | Neubert | |
| 5,160,248 A | * | 11/1992 | Clarke | 415/9 |
| 5,344,280 A | * | 9/1994 | Langenbrunner et al. | 415/9 |
| 5,431,532 A | | 7/1995 | Humke | |
| 5,451,448 A | | 9/1995 | Sawko | |
| 5,486,086 A | | 1/1996 | Bellia | |
| 5,618,606 A | * | 4/1997 | Sherrick et al. | 428/113 |
| 5,624,622 A | | 4/1997 | Boyce | |
| 5,897,739 A | * | 4/1999 | Forster et al. | 156/285 |
| 6,049,978 A | * | 4/2000 | Arnold | 29/889.1 |
| 6,053,696 A | | 4/2000 | Roberts | |
| 6,059,524 A | * | 5/2000 | Costa et al. | 415/9 |
| 6,149,749 A | * | 11/2000 | McBroom | 156/94 |
| 6,180,206 B1 | * | 1/2001 | Kain, Jr. | 428/116 |
| 6,206,067 B1 | * | 3/2001 | Kociemba et al. | 156/382 |
| 6,290,455 B1 | | 9/2001 | Hemmelgarn et al. | |
| 6,355,203 B1 | * | 3/2002 | Charmes et al. | 264/493 |

(Continued)

*Primary Examiner* — David Bryant
*Assistant Examiner* — Jason L Vaughan
(74) *Attorney, Agent, or Firm* — General Electric Company; Sushupta T. Sudarshan; Gary M. Hartman

(57) ABSTRACT

Methods for repairing composite containment casings involving providing a composite containment casing having an integrated abradable system, the abradable system having at least one damaged portion, and including a sandwich structure, and at least one abradable layer, removing the damaged portion of the abradable system to leave a hole, shaping a sandwich structure segment to produce a shaped sandwich structure, placing the shaped sandwich structure into the hole in the abradable system, infusing a resin into the shaped sandwich structure, and curing the containment casing having the shaped sandwich structure, and applying at least one abradable layer to the shaped sandwich structure to produce the containment casing having a repaired integrated abradable system.

16 Claims, 4 Drawing Sheets

U.S. PATENT DOCUMENTS

| | | | |
|---|---|---|---|
| 6,468,372 B2 * | 10/2002 | Kociemba et al. | 156/71 |
| 6,510,961 B1 | 1/2003 | Head et al. | |
| 6,551,441 B1 * | 4/2003 | Sato et al. | 156/323 |
| 6,740,381 B2 | 5/2004 | Day | |
| 6,742,547 B2 | 6/2004 | Bryn | |
| 6,758,924 B1 * | 7/2004 | Guijt | 156/64 |
| 6,761,783 B2 * | 7/2004 | Keller et al. | 156/94 |
| 6,770,349 B2 * | 8/2004 | Itoh et al. | 428/73 |
| 6,814,541 B2 * | 11/2004 | Evans et al. | 415/200 |
| 6,820,334 B2 * | 11/2004 | Kebbede et al. | 29/889.1 |
| 6,852,192 B2 * | 2/2005 | Sato et al. | 156/292 |
| 6,892,766 B2 | 5/2005 | Bryn | |
| 6,913,436 B2 | 7/2005 | McMillan | |
| 7,125,217 B2 | 10/2006 | Care | |
| 7,278,208 B2 * | 10/2007 | Le Saint et al. | 29/889.1 |
| 7,402,022 B2 | 7/2008 | Harper et al. | |
| 7,419,556 B2 * | 9/2008 | Holland | 156/98 |
| 7,572,347 B2 * | 8/2009 | Bogue | 156/98 |
| 7,914,251 B2 | 3/2011 | Pool et al. | |
| 8,108,979 B2 * | 2/2012 | Stadtlander et al. | 29/402.09 |
| 2005/0074593 A1 | 4/2005 | Day et al. | |
| 2005/0089391 A1 * | 4/2005 | Stretton | 415/9 |
| 2005/0262690 A1 * | 12/2005 | Swaffar | 29/889.1 |
| 2005/0271503 A1 | 12/2005 | Harper et al. | |
| 2006/0034682 A1 | 2/2006 | McMillan | |
| 2006/0134251 A1 | 6/2006 | Blanton et al. | |
| 2006/0260293 A1 * | 11/2006 | Launders | 60/226.1 |
| 2007/0275211 A1 * | 11/2007 | Bogue | 428/116 |
| 2007/0275212 A1 * | 11/2007 | Stadtlander et al. | 428/116 |
| 2007/0289692 A1 * | 12/2007 | Bogue et al. | 156/98 |
| 2008/0233346 A1 * | 9/2008 | Bogue et al. | 428/116 |

\* cited by examiner

METHODS FOR REPAIRING COMPOSITE CONTAINMENT CASINGS

TECHNICAL FIELD

Embodiments described herein generally relate to methods for repairing composite containment casings. More specifically, embodiments herein generally describe methods for repairing composite fan casings having integrated abradable systems.

BACKGROUND OF THE INVENTION

In gas turbine engines, such as aircraft engines, air is drawn into the front of the engine, compressed by a shaft-mounted compressor, and mixed with fuel in a combustor. The mixture is then burned and the hot exhaust gases are passed through a turbine mounted on the same shaft. The flow of combustion gas expands through the turbine which in turn spins the shaft and provides power to the compressor. The hot exhaust gases are further expanded through nozzles at the back of the engine, generating powerful thrust, which drives the aircraft forward.

Because engines operate in a variety of conditions, foreign objects may undesirably enter the engine. More specifically, foreign objects, such as large birds, hailstones, ice, sand and rain may be entrained in the inlet of the engine where they may impact the engine or a fan blade therein. Sometimes these impacts can result in a portion of the contacted blade being torn loose from the rotor, which is commonly known as fan blade out. The loose fan blade may then impact the interior of the fan casing. Similarly, in cold weather and at high altitudes, ice can form and accumulate on the fan blades. When engine speed is rapidly accelerated, or altitude is decreased, the ice can shed, also resulting in an impact with the interior of the fan casing.

In recent years composite materials have become increasingly popular for use in a variety of aerospace applications because of their durability and relative lightweight. Although composite materials can provide superior strength and weight properties, and can lessen the extent of damage to the fan casing during impacts such as ice shedding and fan blade outs, there remains room for improvement.

Current composite containment technology, such as that used to make fan casings, typically employs a thick, monolithic hardwall design that is capable of withstanding an impact caused by ice and/or released fan blades, and also fragmentizing the ice or released fan blades, breaking them into smaller pieces. These fragmentized pieces can then be purged from the engine without causing significant damage to either the engine or the body of the aircraft. The construction of the fan casing provides for the dissipation of impact energy using any of a number of mechanisms including fiber/matrix interference failure, matrix microcracking and ply delamination.

More specifically, current hardwall designs generally consist of an abradable system having an abradable layer attached to a substrate structure that includes a glass/epoxy composite face sheet bonded to a Nomex® honeycomb core, which can be very lightweight. See U.S. Pat. No. 5,344,280 to Langenbrunner et al. However, such honeycomb cores are typically not designed to provide significant energy absorption during a fan blade out event. More specifically, the design of the honeycomb core results in an abradable system having radial weakness. Thus, released fan blades will have a tendency to simply cut through the honeycomb core upon impact, leaving roughly 99% of the impact energy to be absorbed by the fan casing body. Moreover, because the current abradable systems require numerous layup, bonding, cure, and machining cycles, the fabrication of such systems can be labor intensive, costly, and can result in a heavier than desired fan casing because of the multiple layers of construction. Additionally, because the abradable system is fabricated separately from, and then attached to, the fan casing, the two parts function independently, rather than as a unitary system.

Accordingly, there remains a need for methods for repairing integrated abradable systems for containment fan casings that can provide improved impact resistance without the previously described time, labor, weight and cost issues.

BRIEF DESCRIPTION OF THE INVENTION

Embodiments described herein generally relate to methods for repairing composite containment casings comprising providing a composite containment casing having an integrated abradable system, the abradable system having at least one damaged portion, and comprising a sandwich structure, and at least one abradable layer, removing the damaged portion of the abradable system to leave a hole, shaping a sandwich structure segment to produce a shaped sandwich structure, placing the shaped sandwich structure into the hole in the abradable system, infusing a resin into the shaped sandwich structure, and curing the containment casing having the shaped sandwich structure, and applying at least one abradable layer to the shaped sandwich structure to produce the containment casing having a repaired integrated abradable system.

Embodiments herein also generally relate to method for repairing composite containment casings comprising providing a composite containment casing having an integrated abradable system, the abradable system having at least one damaged portion, and comprising a sandwich structure and at least one abradable layer, removing the damaged portion of the abradable system to leave a hole, shaping a sandwich structure segment to produce a shaped sandwich structure, infusing a resin into the shaped sandwich structure, curing the shaped sandwich structure, bonding the shaped sandwich structure in the hole in the abradable system, and applying at least one abradable layer to the shaped sandwich structure to produce the containment casing having a repaired integrated abradable system.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to methods for repairing composite containment casings having integrated abradable systems. Those skilled in the art will understand that the following description is applicable to all types of gas turbine engines, including but not limited to Low Bypass Fan Engines, High Bypass Fan Engines and Ultra-High Bypass Fan Engines.

Figure 1:
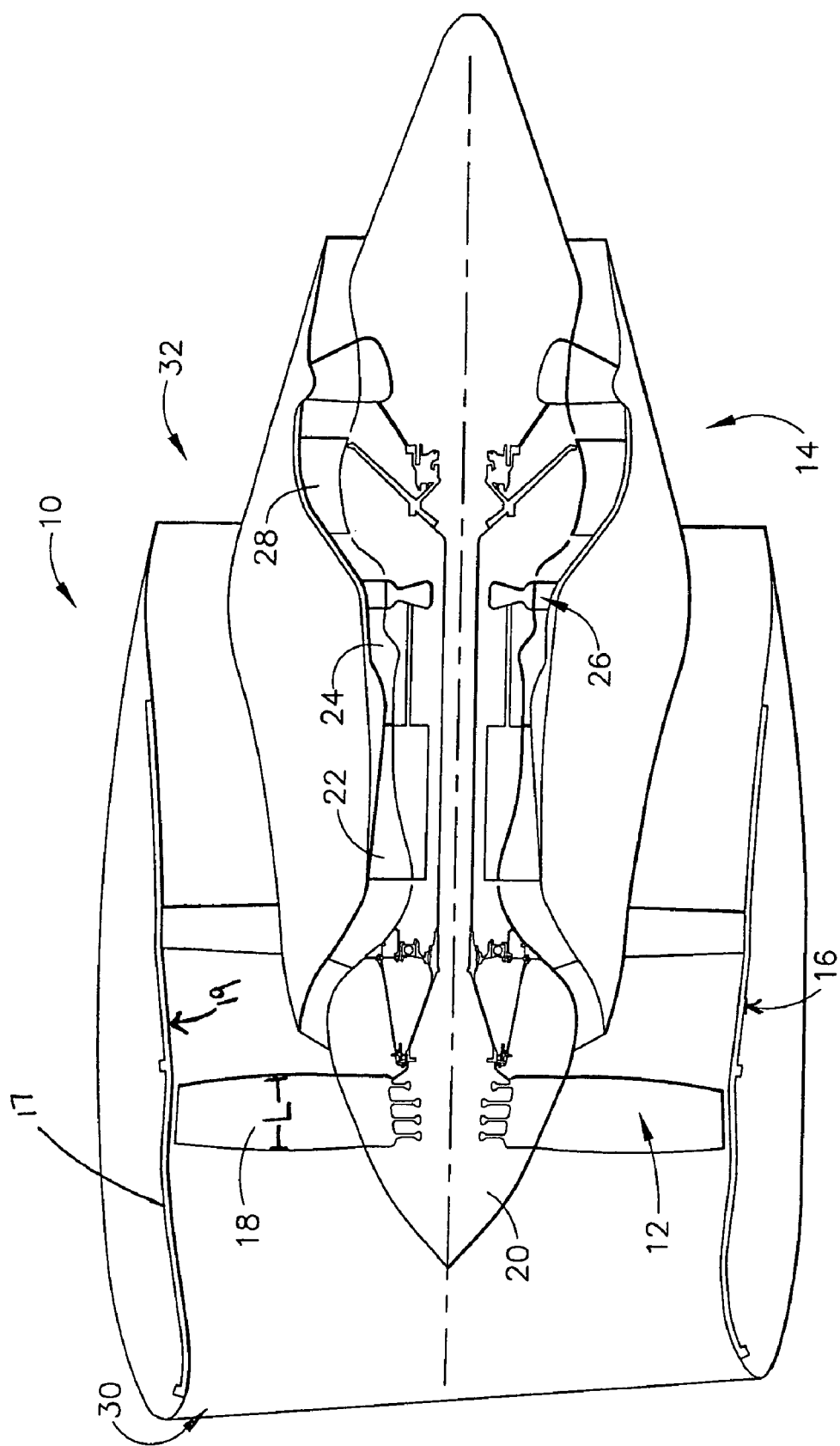
FIG. 1 is a schematic cross-sectional view of one embodiment of a gas turbine engine in accordance with the description herein.

Turning to the figures, FIG. 1 is a schematic representation of one embodiment of a conventional gas turbine engine 10 that generally includes a fan assembly 12 and a core engine 14. Fan assembly 12 may include a composite fan casing 16 having a body 17, and an array of fan blades 18 extending radially outwardly from a rotor disc 20. Core engine 14 may include a high-pressure compressor 22, a combustor 24, a high-pressure turbine 26 and a low-pressure turbine 28. Engine 10 has an intake end 30 and an exhaust end 32.

Figure 2:
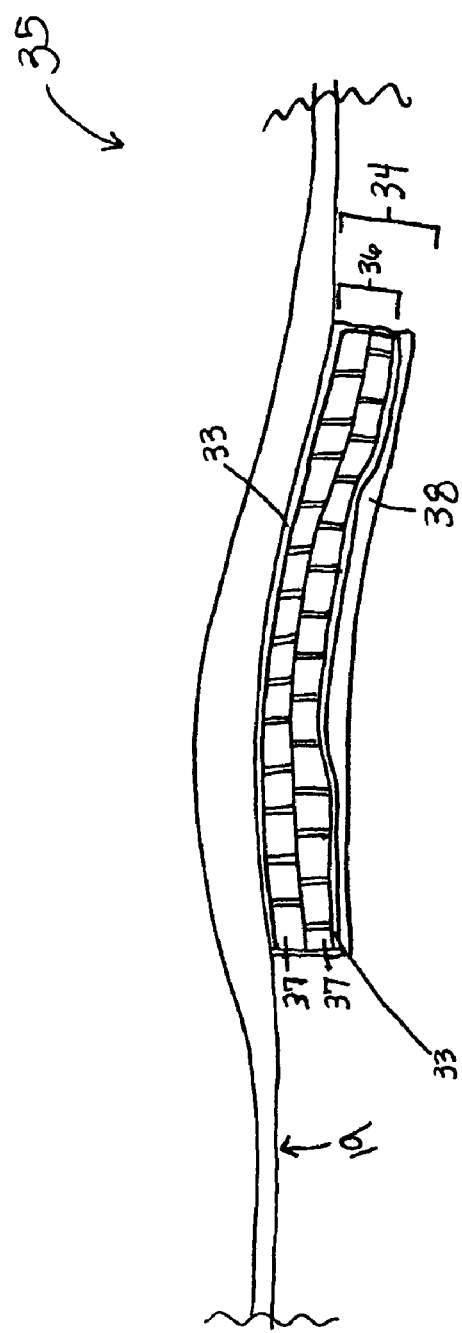
FIG. 2 is a schematic cross-sectional view of a portion of one embodiment of a fan casing having an integrated abradable system in accordance with the description herein.

As previously described, embodiments herein may comprise a fan casing 35 having an integrated abradable system 34 adjoined thereto that can lessen the damage resulting from a fan blade out or other like event. While the abradable system 34 may take a variety of configurations, it may generally comprise a sandwich structure 36 and at least one abradable layer 38, as shown in FIG. 2. As used herein, "sandwich structure" refers to a multi-layered structure generally comprising a first facesheet 33, and a second facesheet 33 positioned about at least one core layer 37, as shown in FIG. 2. First and second facesheet 33, as well as core layer 37, may comprise any woven, braided, or non-crimp fabric capable of being infused with a resin and cured to produce a composite material, such as carbon fibers, graphite fibers, glass fibers, ceramic fibers, and aramid polymer fiber. Moreover, the material used in core layer 37 can have non-isotropic properties, and may include cell, columnar, and truss configurations. A plurality of core layers 37 may be desirable to permit tailoring of the orthotropic properties of sandwich structure 36 as a function of the fan casing 35 radius or thickness.

Figure 3:
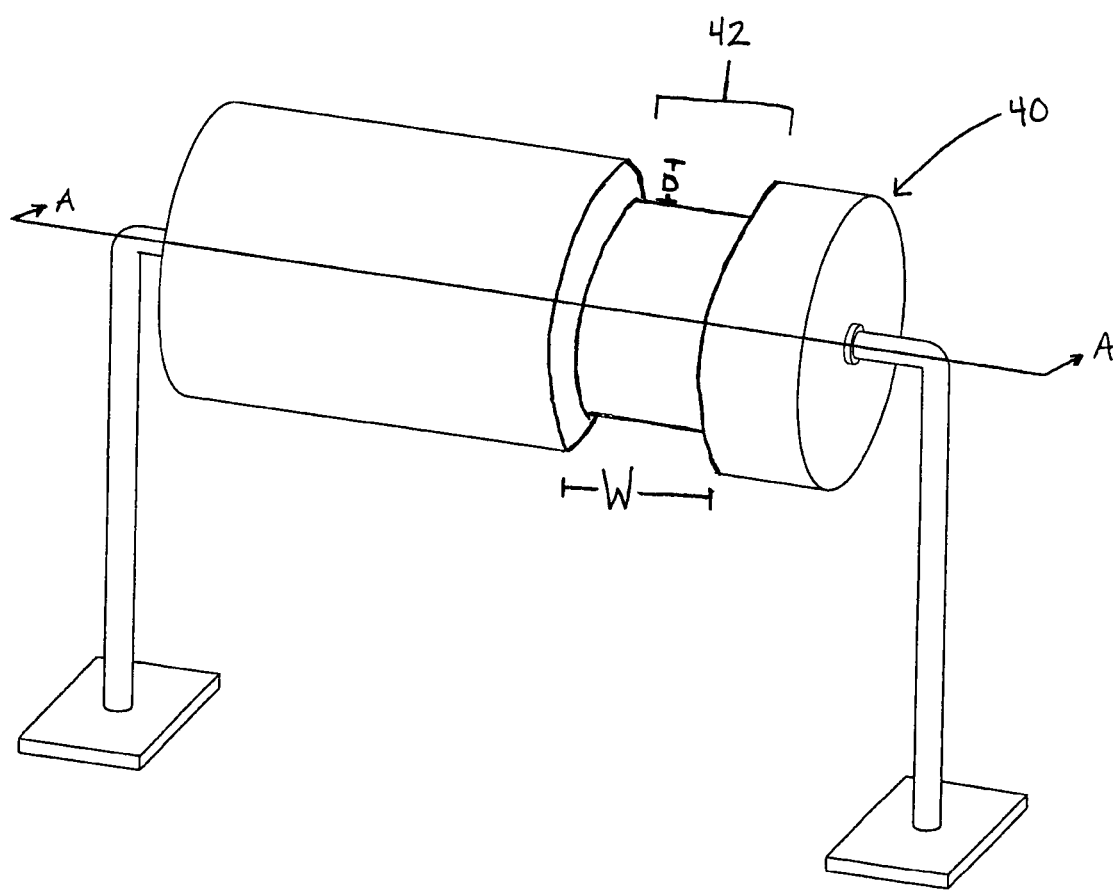
FIG. 3 is a schematic perspective view of one embodiment of a mandrel having a pocket in accordance with the description herein.

Some examples of materials suitable for use as sandwich structure 36 can include, but should not be limited to, TYCOR® (WebCore Technologies, Inc., Miamisburg, Ohio, see U.S. Patent Application 2005/0074593) shown in FIG. 2, or 3-D woven truss configurations (Bally Ribbon Mills, Bally, Pa., see U.S. Pat. Nos. 6,742,547 and 6,892,766) shown in FIGS. 4 and 5.

It is envisioned that during the fabrication process, sandwich structure 36 can be designed to be strong radially and weak circumferentially. Radial strength will allow for the absorption and dissipation of impact energy generated by a released fan blade, as well as the alteration of the released blade's flight trajectory. Circumferential weakness will allow for sandwich structure 36 to become crushed and deformed when impacted by a fan blade due to unbalanced rotor orbiting. Taken together, this radial strength and circumferential weakness can allow the sandwich structure 36 to help absorb energy generated by a released fan blade, thereby reducing the energy that will need to be absorbed by the fan casing 35. This can lead to the fabrication of a thinner, lighter fan casing 35. Additionally, sandwich structure 36 can maintain its mechanical integrity, thereby reducing the likelihood the released fan blade will contact and/or significantly damage the fan casing 35.

Abradable layer 38 refers to the radially innermost layer of integrated abradable system 34 and provides a region against which the fan blades may occasionally rub throughout engine operation. Abradable layer 38 may generally comprise any low-density, syntactic film epoxy suitable for use in a clearance control application that can be resistant to damage from ice impact and can be easily repaired/replaced throughout the service life time of the fan casing 35, as explained herein below. One example of a suitable material for use as abradable layer 38 is Hysol® EA 9890, though the embodiments herein should not be limited to such. Additionally, abradable layer 38 can be bonded to the fan casing 35 so as to cover sandwich structure 36. Any conventional bonding materials and techniques known to those skilled in the art may are acceptable for use herein.

In general, a fan casing 35 having an integrated abradable system 34 can be made using conventional composite manufacturing processes. However, some modifications to the tooling used in the process are required. As shown in FIG. 3, a mandrel 40 may be provided for fabricating embodiments of the fan casing 35 described herein. Mandrel 40 may be similar to conventional tools used in fan casing fabrication, see for example, U.S. Patent Application No. 2006/0134251 to Blanton et al., with the exception that mandrel 40 can have a pocket 42 disposed circumferentially thereabout for receiving truss core layer 37 of abradable system 34. Mandrel 40 can be "substantially cylindrical," and may be generally shaped like a cylinder, either with or without a contour.

Figure 4:
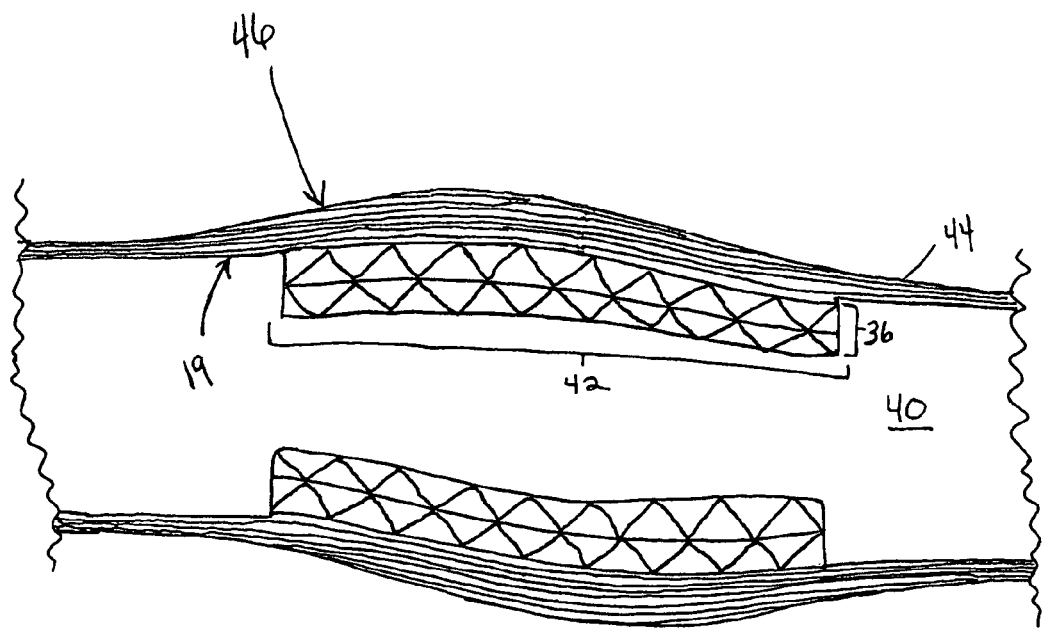
FIG. 4 is a schematic cross-sectional view of a portion of the mandrel of FIG. 3 taken along line A-A having a sandwich structure positioned in the pocket and material wrapped thereabout in accordance with description herein.
Figure 5:
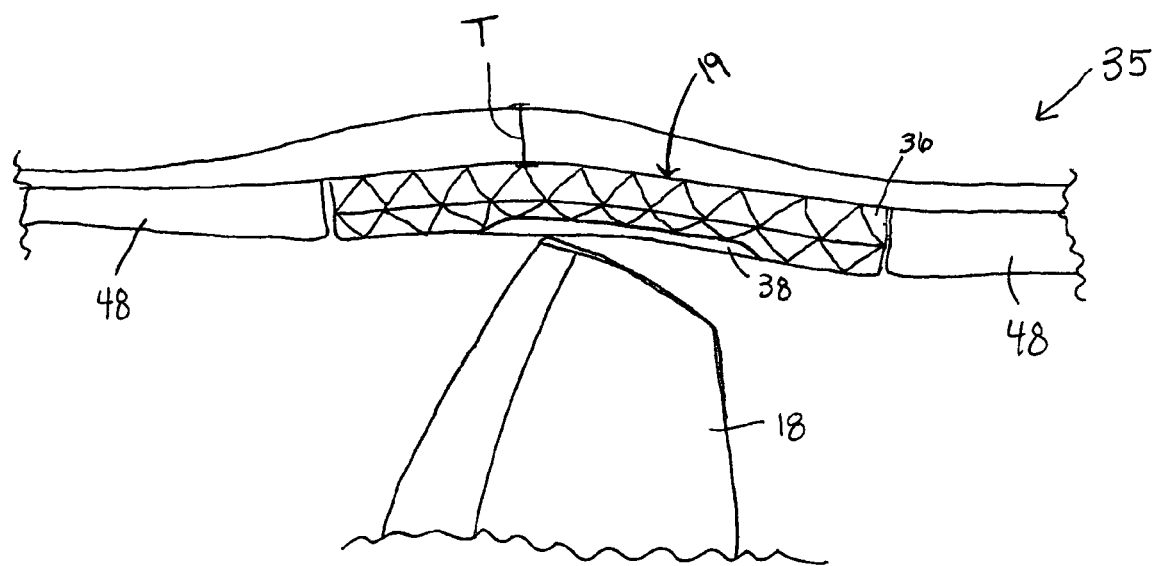
FIG. 5 is a schematic cross-sectional view of a portion of one embodiment of a fan casing having an integrated abradable system and the system's position relative to a fan blade in accordance with the description herein.

More specifically, and as shown in FIG. 3, pocket 42 may have any dimension that corresponds to the desired dimensions of sandwich structure 36 of abradable system 34. However, in general, pocket 42 (and therefore sandwich structure 36) can have a width W of from about one to about three times the axial chord length L of fan blade 18 as indicated in FIG. 1, and a depth D of from about one to about five times the radial thickness T of fan casing 35, which is measured at the thickest cross-section of the fan casing 35 as shown in FIG. 5. As an example, if fan blade 18 comprises an axial chord length L of about 12 inches (about 30.4 cm) and a preform 46 (FIG. 4) of the fan casing 35 comprises a radial thickness T of about 1 inch (about 2.54 cm), then pocket 42 may have a width W of from about 12 inches (about 30.4 cm) to about 36 inches (about 91.4 cm) and a depth D of from about 1 inch (about 2.54 cm) to about 5 inches (about 12.7 cm). Moreover, because abradable system 34 functions to absorb impact from a released fan blade, pocket 42 can be positioned along mandrel 40 such that sandwich structure 36, and therefore abradable system 34, will be adjacent to fan blades 18 when the fan assembly of the engine is assembled, as shown in FIG. 5.

Fabrication of fan casing 35 having integrated abradable system 34 can be accomplished in a couple of ways. In one embodiment, sandwich structure 36 having the desired number of core layers 37 may first be positioned within pocket 42 of mandrel 40, as shown in FIG. 4. Next, at least one ply of a material 44 may be continuously applied about mandrel 40 having pocket 42 containing sandwich structure 36 until the desired thickness is obtained. Similar to facesheet 33 of sandwich structure 36, material 44 may comprise any woven, braided, or non-crimp fabric capable of being infused with a resin and cured to produce a composite material. In one embodiment, the material may comprise carbon fibers, graphite fibers, glass fibers, ceramic fibers, and aramid polymer fibers. Additionally, each fiber tow may comprise from about 3000 to about 24,000 individual fiber filaments.

The resulting fan casing preform 46 having an integrated sandwich structure 36, may be treated with any suitable resin, such as epoxy, using conventional techniques for infusing the resin throughout the fan casing preform 46 and the integrated sandwich structure 36. Once the resin has been infused, fan casing preform 46 may then be cured using traditional curing methods known to those skilled in the art.

In an alternate embodiment, fan casing preform 46 can be layed up about a conventional mandrel using conventional techniques, followed by resin infusion and curing. The resulting fan casing 35 may then have sandwich structure 36, which has been previously resin-infused and cured, bonded to interior 19 thereof. Like the previous embodiment, sandwich structure 36 can be positioned adjacent to fan blades 18 when the fan assembly of the engine is assembled, as shown in FIG. 5.

Whichever method of fabrication is selected, to complete fan casing 35 having abradable system 34, at least one abradable layer 38 may be applied over sandwich structure 36, as shown in FIG. 5, using any suitable method, including, but not limited to, adhesively bonding or mechanically attaching. Further finishing steps conventional to all fan casing fabrication processes, such as the application of one or more acoustic panels 48, may then be carried out.

The integrated abradable systems of the fan casing embodiment described herein can provide several benefits in addition to those previously discussed. For example, the fan casing embodiments herein can require significantly fewer layup, bonding, cure, and machining cycles than conventional fan casings due to the integrated nature and construction of the abradable system. Moreover, because the sandwich structure core layer(s) can be made from any non-metallic, composite materials, the abradable systems herein can better absorb impact energy, yet still be lightweight. In particularly, the embodiments of abradable system described herein can absorb up to about 25% of the impact energy generated by a released fan blade, leaving only about 75% of the impact energy to be absorbed by the body of the fan casing. By "impact energy," it is meant the kinetic energy of the released fan blade. This allows the thickness and, therefore, the weight, of fan casing 35 to be reduced.

Another benefit provided by the presently described embodiments is ease of repair. Those skilled in the art will understand that the entire abradable system 34 need not be removed and reapplied if the damage is limited to only a portion thereof. Rather, should a portion of the abradable system 34 become damaged by ice shedding, a fan blade out, or other like occurrence, that portion only can be replaced. Similar to fabrication, repair may be carried out in a couple of ways. In one embodiment, the damaged portion of the abradable system 34 can be machined, or cut, out of the fan casing 35 using conventional methods leaving a hole in the abradable system 34. A sandwich structure segment, which can comprise any number of core layers 37 and facesheets 33 as needed, may then be shaped to the proper dimensions needed to fill the hole and to create a shaped sandwich structure 36. The shaped sandwich structure 36 may then be positioned within the hole in the abradable system 34 and resin may be infused therein. The shaped sandwich structure 36 may then be cured to produce a fan casing 35 having a repaired integrated abradable system 34.

In an alternate embodiment, the damaged portion of the abradable system 34 can again be machined out using conventional methods to create a hole in the abradable system 34. A sandwich structure segment may be shaped to the proper dimensions need to fill the hole in the abradable system 34 and to create a shaped sandwich structure 36. In this embodiment, the shaped sandwich structure 36 may first be infused with resin and cured before being placed into hole and bonded to the abradable system 34 to produce a fan casing 35 having a repaired integrated abradable system 34. Those skilled in the art will understand that any acceptable adhesive or other like material may be used to bond the shaped sandwich structure 36 in the hole on the abradable system 34.

Regardless of the method of repair utilized, after bonding the filler sandwich structure to the fan casing, a new abradable layer may be applied to the filler sandwich structure in the manner described previously.

The repaired fan casing having the integrated abradable system can provide all of the benefits described previously. In addition, the ability to repair only the damaged portion of the fan casing can reduce the time and expense that would otherwise be involved in replacing the entire abradable system.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for repairing a composite containment casing comprising a fan casing having an abradable system integrated therewith by a process comprising:
   assembling a fan casing preform and a sandwich structure;
   infusing the fan casing preform and the sandwich structure with a resin;
   curing the resin; and
   applying at least one abradable layer to the sandwich structure to yield the containment casing comprising the fan casing and an integrated abradable system;
   wherein the abradable system has at least one damaged portion, and the method of repairing the containment casing comprises:
   removing the damaged portion of the abradable system to create a hole in the abradable system within the containment casing;
   shaping a sandwich structure segment to produce a shaped sandwich structure;
   placing the shaped sandwich structure into the hole in the abradable system;
   infusing a resin into the shaped sandwich structure while the shaped sandwich structure is within the hole in the abradable system; and
   curing the resin within the shaped sandwich structure while the shaped sandwich structure is within the hole in the abradable system; and
   applying at least one abradable layer to the shaped sandwich structure to produce a repaired integrated abradable system within the containment casing.

2. The method of claim 1 wherein the sandwich structure segment comprises a first facesheet, at least one core layer, and a second facesheet wherein the core layer comprises any of a cell configuration, a columnar configuration, or a truss configuration.

3. The method of claim 1 wherein the sandwich structure comprises a material selected from the group consisting of carbon fibers, graphite fibers, glass fibers, ceramic fibers, aramid polymer fibers, and combinations thereof.

4. The method of claim 1 wherein the containment casing comprises a fan casing for a gas turbine engine fan assembly that includes at least one fan blade, the fan casing having a radial thickness.

5. The method of claim 1 wherein the abradable layer comprises a low-density syntactic film epoxy.

6. The method of claim 2 wherein the sandwich structure comprises a plurality of core layers.

7. The method of claim 2 wherein the shaped sandwich structure is strong radially and weak circumferentially.

8. The method of claim 1 wherein the containment casing is a fan casing for a fan assembly of a gas turbine engine.

9. A method for repairing a composite containment casing comprising a fan casing having an abradable system integrated therewith by a process comprising:
 assembling a fan casing preform and a sandwich structure;
 infusing the fan casing preform and the sandwich structure with a resin;
 curing the resin; and
 applying at least one abradable layer to the sandwich structure to yield the containment casing comprising the fan casing and an integrated abradable system;
 wherein the abradable system has at least one damaged portion, and the method of repairing the containment casing comprises:
 removing the damaged portion of the abradable system to create a hole in the abradable system within the containment casing;
 shaping a sandwich structure segment to produce a shaped sandwich structure;
 placing the shaped sandwich structure into the hole in the abradable system;
 infusing a resin into the shaped sandwich structure while the shaped sandwich structure is within the hole in the abradable system;
 curing the resin within the shaped sandwich structure while the shaped sandwich structure is within the hole in the abradable system so as to bond the shaped sandwich structure in the hole in the abradable system; and
 applying at least one abradable layer to the shaped sandwich structure to produce a repaired integrated abradable system within the containment casing.

10. The method of claim 9 wherein the sandwich structure segment comprises a first facesheet, at least one core layer, and a second facesheet wherein the core layer comprises any of a cell configuration, a columnar configuration, or a truss configuration.

11. The method of claim 9 wherein the sandwich structure comprises a material selected from the group consisting of carbon fibers, graphite fibers, glass fibers, ceramic fibers, aramid polymer fibers, and combinations thereof.

12. The method of claim 9 wherein the containment casing comprises a fan casing for a gas turbine engine fan assembly that includes at least one fan blade, the fan casing having a radial thickness.

13. The method of claim 9 wherein the abradable layer comprises a low-density syntactic film epoxy.

14. The method of claim 10 wherein the sandwich structure comprises a plurality of core layers.

15. The method of claim 10 wherein the shaped sandwich structure is strong radially and weak circumferentially.

16. The method of claim 9 wherein the containment casing is a fan casing for a fan assembly of a gas turbine engine.

* * * * *